Aug. 17, 1954  F. T. LEE  2,686,466
PAPER SHREDDER AND PRESS
Filed May 15, 1951  3 Sheets-Sheet 3

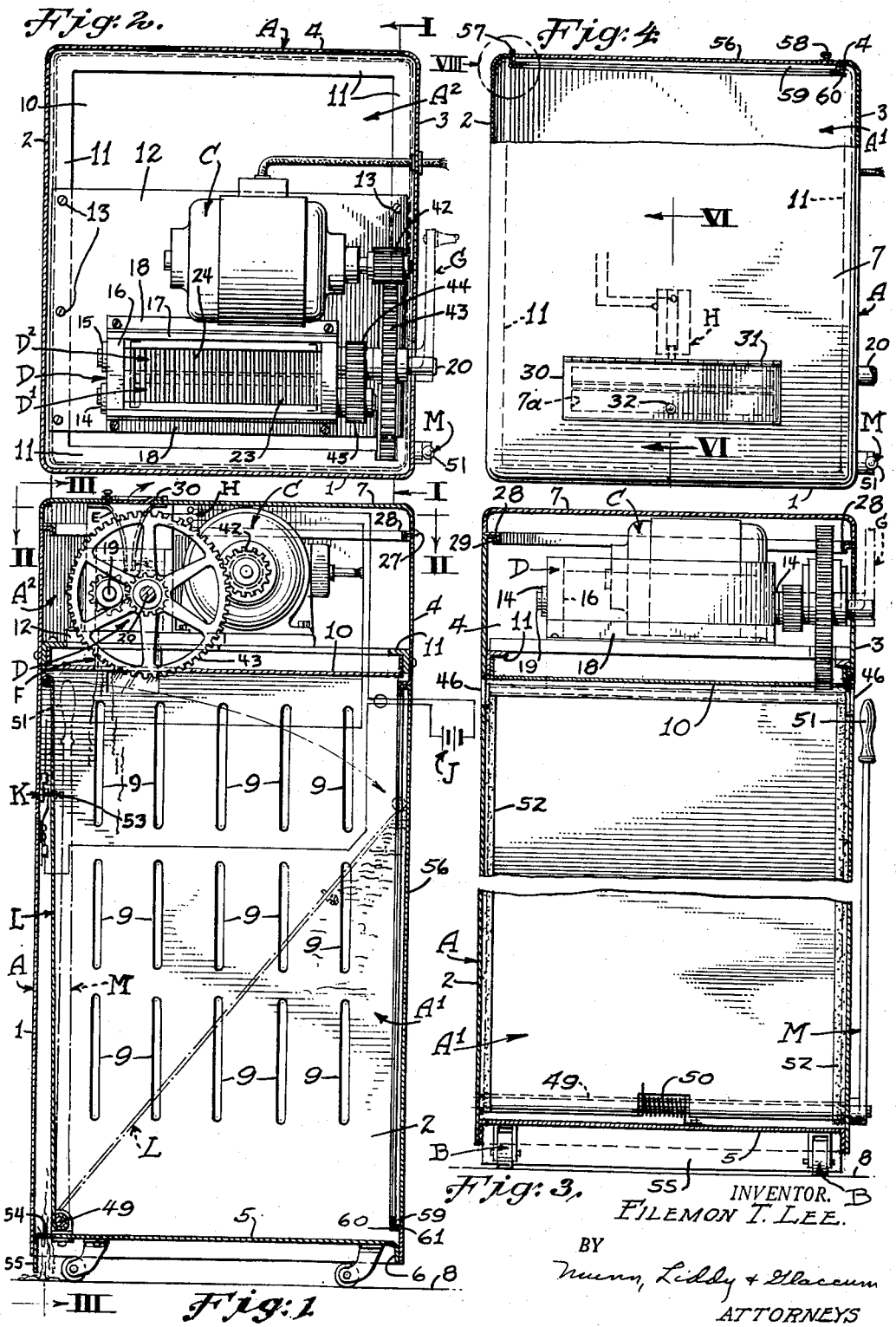

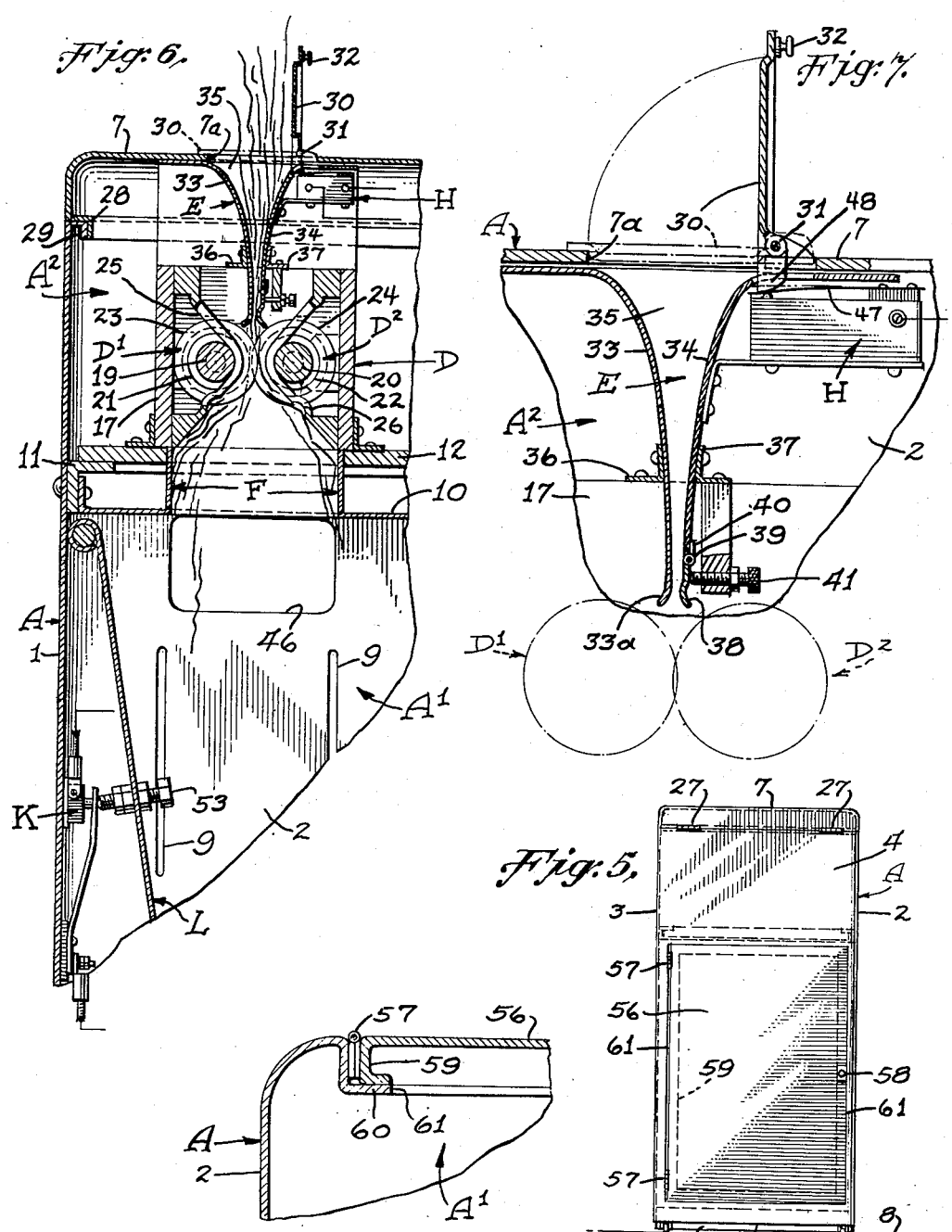

INVENTOR.
FILEMON T. LEE
BY
Munn, Liddy & Glaccum
ATTORNEYS

Patented Aug. 17, 1954

2,686,466

UNITED STATES PATENT OFFICE 2,686,466

PAPER SHREDDER AND PRESS

Filemon T. Lee, San Francisco, Calif.

Application May 15, 1951, Serial No. 226,433

3 Claims. (Cl. 100—97)

An object of my invention is to provide a paper shredder and press that preferably makes use of the paper shearing rollers shown in my copending application on a paper shredding machine, Ser. No. 94,851, filed May 23, 1949, now Patent 2,621,567, issued December 16, 1952. In the copending case, I show a horizontally disposed table top on which the material to be shredded is placed. The material is fed by hand between two horizontally upper and lower disposed shearing rollers, each of which is provided with a plurality of spaced discs having cutting blades mounted on their peripheries. The circular cutting blades on the upper shearing roller have their lower portions received in the spaces provided between the adjacent cutting blades on the lower shearing roller, and in like manner, the circular cutting blades on the lower shearing roller have their upper portions received in the spaces provided between the adjacent cutting blades on the upper shearing roller. The actual cutting operation is accomplished at the points where the cutting blades on the upper shearing roller start to overlap the cutting blades on the lower shearing roller.

In the copending case, the paper or other material to be shredded is fed in a horizontal plane from the table top into the shearing rollers. The present invention is designed for office use and therefore the paper shredder and press are disposed within a cabinet-shaped casing. The material to be shredded is fed through an opening in the top of the cabinet. This opening is normally closed by a cover. The material shredding rollers are placed under the cabinet top and in a position to receive the material fed into the opening. Novel means is provided for adjusting the amount of material fed to the shearing rollers and thus the device will prevent the overloading of these rollers with material to be shredded.

One of the novel features of the invention is the provision of a storage space in the cabinet disposed below the shearing rollers for receiving the shredded material from the rollers, this storage space having a paper-pressing member adapted to press the shredded material into a compact form within the storage space. The paper-pressing member is positioned for compressing the shredded material into a part of the storage space removed from the shearing rollers, thereby providing a space adjacent to the rollers for receiving additional shredded material from the rollers. In this way the cabinet can retain far more shredded material in the storage space than would otherwise be possible. When the material is removed from the cabinet, it will occupy far less space because the material is in a compressed state. A door to the side of the cabinet provides access to the interior of the cabinet for removing the compressed material.

Other objects and advantages will appear in the following specification, and the novel features of the device will be particularly pointed out in the appended claims.

My invention is illustrated in the accompanying drawing forming a part of this application, in which:

Figure 1 is a vertical section taken along the line I—I of Figure 2;

Figure 2 is a horizontal section taken along the line II—II of Figure 1;

Figure 3 is a vertical section taken along the line III—III of Figure 1;

Figure 4 is a top plan view of the device with a portion being shown in section to illustrate the removal door through which the compressed material is removed;

Figure 5 is a rear elevation of the device shown on a smaller scale;

Figure 6 is an enlarged transverse section taken along the line VI—VI of Figure 4 and shows the paper shearing rollers;

Figure 7 is an enlargement of the paper feeding trough shown in Figure 6, and illustrates the mechanism for determining the amount of material that can be fed to the shearing rollers at any given time;

Figure 8 is an enlarged detail of the hinge structure shown in the circled portion VIII of Figure 4;

Figure 9:
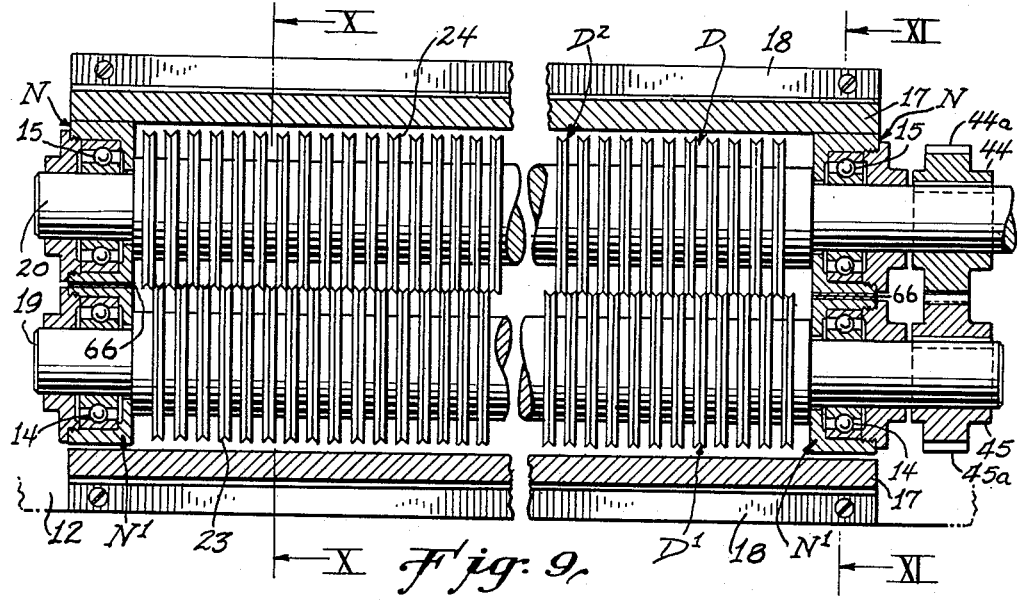
Figure 9 is a section on a larger scale through a slightly modified form of the shearing rollers.

In carrying out my invention, I provide a cabinet indicated generally at A in Figures 1 to 5, inclusive. The cabinet is composed of a front wall 1, side walls 2 and 3, and a rear wall 4. These walls may be constructed from any material desired and I have shown them made of sheet metal which is light in weight and also strong as well as fire-proof. The cabinet has a bottom 5, also preferably made from a piece of sheet metal and the bottom has its periphery provided with a downwardly turned flange 6 that may be welded or otherwise secured to the four walls of the cabinet 1 to 4, inclusive. The cabinet may be reinforced in any desired manner and the sides 2 and 3 are preferably provided with elongated and vertically extending slots 9 for permitting the operator to view the interior of the cabinet. The slots are made narrow so that the shredded paper or other material will not pass therethrough.

The cabinet A is preferably divided into a storage compartment A1 and a paper shredding compartment A2. These two compartments are separated from each other by a horizontally disposed partition 10. In both Figures 1 and 3, I show the partition 10 as being secured to an angle iron frame 11 that extends around the four walls of the cabinet and is secured to the inner surfaces of these walls. Figure 2 illustrates the shape of the angle iron frame 11 and this same figure further shows a motor supporting plate 12 that is mounted on the angle iron frame 11 and is secured in place by screws 13 or other suitable fastening means.

The plate 12 in Figure 2 not only supports an electric motor C, but it also supports the paper shredding mechanism indicated generally at D. The particular type of paper shredding mechanism used in the present invention is similar to that shown in my copending application on a paper shredding machine, Serial No. 94,851, filed May 23, 1949. Reference to Figure 6 indicates the paper shearing mechanism D as being composed of a pair of paper shearing rollers D1 and D2. These rollers are mounted in bearings 14 and 15, see Figure 2, and the bearings in turn are provided in the ends 16 of a box-like frame 17 that houses the shearing rollers. The frame 17 is mounted on the plate 12 and is secured in place by angle members 18 or other suitable fastening means.

The shearing rollers D1 and D2 have their shafts 19 and 20 provided with a plurality of spaced-apart discs 21 and 22 that are integral with the shafts. Circular cutters 23 and 24 are mounted on the discs 21 and 22, respectively, and the cutters on one disc are received in the spaces provided between the cutters on the other disc. Figure 6 also shows curved gratings 25 and 26 mounted on the sides of the box-like frame 17 and these combs have bars that extend between the circular cutters so as to guide the incoming material between the two rows of cutters and also to remove the shredded material from the shearing rollers. This feature is clearly shown in Figure 6. The parts of the paper shearing mechanism D just described are illustrated in more detail in my copending application above mentioned and all of the features of the copending case pertaining to the paper shearing mechanism are made a part of the disclosure of the present case.

I will now describe the paper feeding mouth or trough and this mechanism is shown in detail in Figure 7. The top 7 of the cabinet is in reality a cover that is hinged at 27, see Figure 5, to the back wall 4 of the cabinet. In Figure 3 I show the rim of the cover 7 provided with an inwardly and downwardly turned flange 28. The top of the four walls 1 to 4, inclusive, are provided with an inwardly and downwardly supporting flange 29 and when the cover 7 is closed, its flange 28 will nest in the flange 29 and be supported thereby. When the cover 7 is opened, access may be had to the motor C and to the paper shredding mechanism D.

Again referring to Figure 7, it will be seen the cover is provided with an opening 7a into which the material to be cut is fed. The size of this opening 7a with reference to the area of the cover top 7 is indicated in Figure 4. The opening 7a is normally closed by a lid 30 that is hinged to the cover 7 at 31. A handle 32 or knob is provided for the lid 30 and this permits an operator to open the lid preparatory to feeding paper through the opening 7a in the cover 7.

I provide a paper feed trough or mouth indicated generally at E in Figure 7. The mouth has front and back walls 33 and 34 of the shape shown in Figure 7. The paper or other material feed mouth E also has end walls 35, see Figures 6 and 7 and these walls are supported by the top of the box-like frame 17. It will further be noted that the front and rear walls 33 and 34 are secured to the top of the box-like frame 17 by angle irons 36 and 37 or other suitable fastening means. The front wall 33 of the mouth E extends down into the interior of the box-like frame 17 and terminates just above the shearing roller D1 as clearly illustrated in Figure 7. The rear wall 34 of the mouth E has an angularly adjustable lip 38 that is hinged to the lower edge of the rear wall 34 at 39. A torsional spring 40 urges the lip 38 against an adjusting screw 41.

When the cover 7 of the cabinet is open, the operator has access to the adjusting screw 41 and may manipulate this screw for moving the lip 38 toward or away from the fixed lip 33a of the front wall 33. The angularly adjustable lip 38 has its lower edge disposed adjacent to the rear shearing roller D2. It will be seen from this construction that the amount of material fed into the mouth E is controlled by the opening between the lips 33a and 38. The operator can feed a designated amount of material to the shearing rollers in this way. After the material has been shredded, it will pass into the passageway F that extends downwardly from the bottom of the box-like frame 17 to the partition 10, see Figure 6. All of the material shredded by the shearing rollers D1 and D2 will move into the storage space A1 in the cabinet A through this passageway F.

Before describing the material pressing means mounted in the storage cabinet A1, it is best to set forth the drive mechanism that connects the motor C to the shearing rollers D1 and D2. This mechanism is disclosed in Figures 1 and 2. The motor C rotates a drive pinion 42 that meshes with a large gear 43 that is directly connected to the rear shearing roller shaft 20. The shaft 20 is operatively connected to the front shearing shaft 19 by intermeshing gears 44 and 45 mounted on the two shafts. When the motor C is connected to a source of current hereinafter described, the shearing rollers will be rotated and will shred any material received from the mouth E and feed this shredded material into the storage space A1 through the passageway F. If for any reason it is desired to reverse the rotation of the shearing rollers, such as to remove any material clogging the rollers, I provide a crank G in Figure 2 that may be mounted on the shaft 20 for rotating the shaft in a reverse direction. This will permit the shearing rollers to be cleared in case they have become clogged for any reason. The shaft 20 is shown extending beyond the outer surface of the side wall 3. In actual practice the end of the shaft will lie flush with the side wall and the opening in the wall will be large enough to permit the crank G to be connected to the shaft if the operator wishes to rotate the shearing rollers D1 and D2 in a reverse direction.

Should a pin or paper clip be carried into the mouth E by mistake, such an object would ride upon the cutting discs 23 and 24 of the shearing rollers at their points of intersection. It is possible to remove such objects by first lifting the cover 7 and then taking a thin magnetic member (not shown) and moving the lower end of the member down through the mouth E and into a position overlying the object to be removed. The object will be attracted to the magnet and can be lifted from the rollers. Since the lifted cover is in a position which permits access to the set screw 41, the latter can be manipulated to open the mouth E to a desired extent and thus afford greater ease in extracting the said object.

I provide a window 46 in the side walls 2 and 3, see Figures 3 and 6, for the purpose of permitting the operator to view the shredded material as it passes through the passageway F and moves into the upper part of the storage compartment A1. If desired a similar window can be provided in the side 3 of the cabinet. The operator can determine when the paper shredding is completed by looking through the window 46.

The motor C can be disconnected from the source of current by the operator merely closing the lid 30. I have shown in Figures 4, 6 and 7 a microswitch H which has an arm 47 adapted to be depressed by a cam 48 on the lid 30 when the lid is swung into open position as illustrated in Figure 7. So long as the switch H is kept closed by the opened lid 30, the motor C will be connected to its source of current and the shearing rollers will continue to operate. A closing of the lid from the full to the dot dash line position shown in Figures 6 and 7, will move the cam 48 away from the switch arm 47 and permit the switch H to open and thus break the circuit to the motor.

In Figure 1 I show the wiring that connects the microswitch H to the source of current J. In addition, I show the switch H in series with another switch K, see also Figure 6, so that when the switch K is opened by means hereinafter described, the current from the source J will also be cut off and the motor C will cease to function.

I will now describe the means for compressing the shredded material that is delivered to the compartment A1 by the paper shredding mechanism D. In Figures 1 and 3, I show a shaft 49 extending across the cabinet A between the sides 2 and 3 thereof. A paper compressor plate L is mounted on the shaft 49 and a torsional spring 50 is also mounted on the shaft and has one end connected to the plate and its other end connected to the base of the cabinet so that the spring will tend to hold the compressor plate in the full line or substantially vertical position illustrated in Figure 1. A hand lever M is secured to the shaft 49 at a point exterior of the side wall 3 and the handle 51 of the lever is disposed substantially waist high so that the operator can readily grasp it.

When the operator wishes to compress the shredded paper or other material that has been delivered to the compartment A1, he swings the lever M from the dot dash line position in Figure 1 to the right for moving the compressor plate L into the dot dash line position shown in the same figure. The compressor plate will carry with it all of the shredded material that lies to the right of the plate when looking at Figure 1. When the plate L is in vertical position, it will be disposed adjacent to the front wall 1 so that all of the material passing into the storage compartment A1 from the passage F will fall to the right of the plate. The plate preferably carries strips 52 of rubber along its side edges, see Figure 3, and these strips contact with the inner surfaces of the side walls 2 and 3 for moving all of the shredded material with the plate when the latter is swung so as to compress the material. In this way the shredded material is compacted into a much smaller bulk than it would otherwise assume.

It will be noted from Figure 1 that the compressor plate L is placed to the left of the passage F and that the passage itself is positioned near the front wall 1. The purpose of this is to compress the shredded paper or other material into a portion of the compartment A1 that is removed from the passage F. This will provide space in the compartment A1 which is disposed directly under the passage F for receiving additional shredded material. I have found that a greater quantity of material can be compressed into the compartment A1 due to this particular arrangement of the parts.

It is advisable to stop the operation of the paper shredding mechanism D when the compressor plate L is moved by the lever M to the right in Figure 1 for compressing the shredded paper, otherwise the material that is being shredded while the plate L is moved to the right in Figure 1, would fall between the plate and the front wall 1. I therefore show in Figures 1 and 6 the switch K which is closed by a set screw 53 when the plate L is in inoperative position. As soon as the plate L is swung to the right in Figure 6, the set screw 53 will permit the switch K to open and cut off the source of current to the motor C, whereupon the motor will cease to operate. As soon as the plate L returns to vertical position, the switch K is again closed and the motor will automatically start. The operator can determine how much material is in the compartment A1 by looking through the elongated slots 9 which are provided in both side walls 2 and 3.

Should any shredded material find its way between the plate L and the front wall 1, this material can drop through a slot 54 provided in the casing bottom 5 and positioned adjacent to the inner surface of the front wall 1, see Figure 1. This slot permits the material to fall directly upon the floor 8. In order to prevent an unsightly appearance, I provide an apron 55 that extends from the bottom 5 down to a position just above the floor 8. In fact, this apron can be an extension of the flange 6 disposed at the front of the cabinet, if desired. When the janitor comes to clean the premises, the cabinet A can be moved to uncover any shredded material that might have passed through the slot 54 and dropped onto the floor 8.

A compartment A1 is provided with a rear door 56 in the rear wall 4, see Figure 5. The door is hinged at 57 and Figure 8 illustrates an enlarged view of the hinge 57 for the door. Both Figures 4 and 5 show the door 56 provided with a door knob 58 by means of which the door may be opened.

Figure 8 illustrates how the marginal edges of the door 56 are reinforced by an angularly shaped flange 59 that extends around the entire perimeter of the door. The rear wall 4 of the cabinet A is provided with an inwardly extending and angularly shaped flange 60 for the door opening 61. This flange will act as a reinforcing means for the wall 4 and at the same time it will constitute a seat for the flange 59 of the door 56. I have found that such a construction will provide sufficient strength to withstand the compressive force exerted by the plate L when the latter is swung into the dot dash line position of Figure 1 for compressing the shredded material. The door can be opened when it is desired to remove the compacted material. Where the device is used in an office, the removal of the material from the compartment A1 may be effected by the janitor who can open the door 56 and thus gain access to the shredded material.

It is possible to use the paper shredding mechanism apart from the storage compartment A1 and shred the paper directly into a waste paper basket or other receptacle. The fact that the shredding device permits the paper to be fed in a downward direction into and through the shearing rollers, adapts the device for such use.

Figures 10, 11:
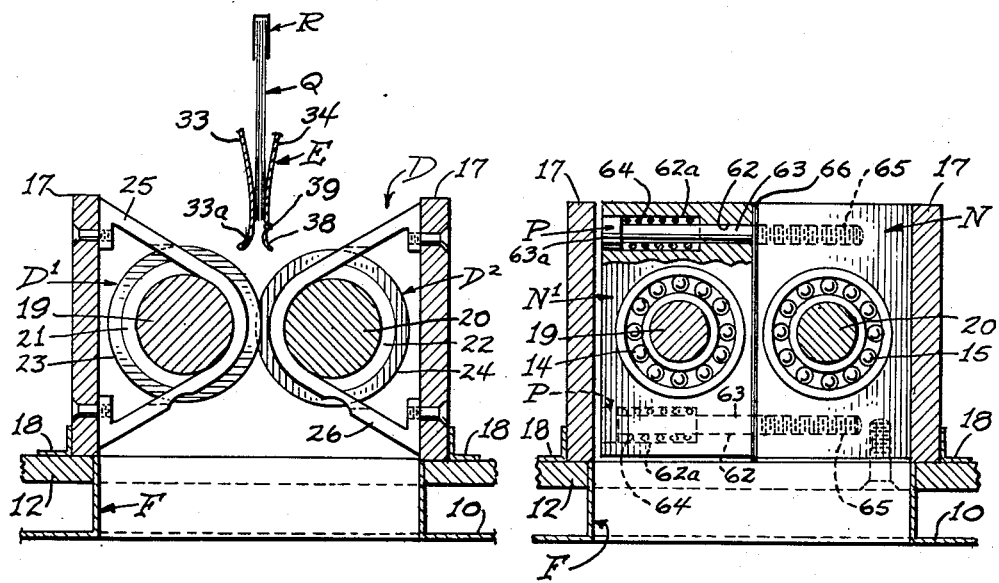
Figures 10 and 11 are sections taken along the lines X—X and XI—XI of Figure 9.

In Figures 9, 10 and 11, I show a slightly modified form of mounting for the paper shredding rollers D. The purpose of the mounting is to permit the shredding rollers to pass small metal objects, such as paper clips, one roller being free to move laterally with respect to the other to open the passage for the clip. In this form one roller shaft 20 has its ends mounted in a pair of fixed bearing blocks N, see Figure 9. The shaft extends beyond one of the blocks N and has the gear 44 keyed thereto. The other paper shredding cutter D1 has its shaft 19 mounted in a pair of movable bearing blocks N1. In Figure 11, I show one of the movable bearing blocks N1 provided with bores 62 and these bores slidably receive the shanks 63 of socket head cap screws P. The bores 62 have enlarged recesses 62a for slidably receiving the heads 63a of the cap screws. Coil springs 64 are mounted on the portions of the shanks 63 that extend through the recesses 62a and these springs bear against one end of the recesses 62a and against the heads 63a.

The socket head cap screws P are threaded into threaded bores 65 provided in the fixed bearing blocks N. I prefer to place shims 66 between the adjacent edges of the bearing blocks N and N1 so as to cause the circumferences of the shearing rollers D1 and D2 shown in Figure 10, to lap each other a desired distance, such as approximately $\frac{1}{32}$ of an inch, although I do not wish to be confined to any particular measurement. As the cutters 23 and 24 wear, the shims may be removed one at a time to maintain the desired amount of overlap between the cutters.

The gear 45 mounted on the shaft 19 and keyed thereto is constantly in mesh with the gear 44 and the teeth 44a are long enough to stay in mesh with the teeth 45a of the gear 45, even though the shaft 19 might be moved to the left in Figure 11 a slight distance with respect to the shaft 20 in order to permit a paper clip or other small object to pass between the cutters. The said paper clip would work its way through the device in the above stated manner and would be retained in the trough formed by the overlapping portions of the cutters on the two rollers only infrequently. The device shown in Figures 9, 10 and 11 is designed to shred as many as eight thicknesses of paper indicated at Q, at one time, note Figure 10. If by chance these papers should be held together by a clip R and the clip be fed accidentally into the shearing rollers with the paper, the paper would be shredded because the springs 62a are strong enough to overcome any tendency for the shaft 19 to move away from the shaft 20 during the shredding of the eight thicknesses of paper. However, when the clip R reaches the cutters 23 and 24, these cutters will grip the clip and pass it therebetween, the shaft 19 moving to the left against the compression of the springs 62a to permit the passage of the clip.

By way of example, the diameter of the wire forming the usual paper clip is .040″ thick. If this clip holds eight thicknesses of paper together, the combined thicknesses of the paper and the clip amounts to approximately .075″. I have made the teeth 44a and 45a on the gears or pinions 44 and 45, long enough to remain in mesh while still permitting the shaft 19 to move away from the shaft 20 a distance of .100 of an inch. Of course the paper shredding cutters can be made larger or smaller and the gears 44 and 45 can likewise be changed in diameter to accommodate the machine for passing metal objects of a predetermined thickness therethrough. In all other respects the modified form of the invention is the same as the form shown in Figures 1 to 8, inclusive, and similar elements will therefore be given like reference numerals.

While I have shown only the preferred forms of my invention, it should be understood that various changes or modifications may be made within the scope of the appended claims without departing from the spirit and scope of the invention.

I claim:

1. In combination: a cabinet having a top and a bottom and at least a first and a second vertical wall opposed to each other and parallelly arranged; the top having an inlet opening for receiving shredded paper, this opening being disposed near the inner surface of the first-mentioned wall; a shredded paper compressing member pivotally mounted within the cabinet at a point near the inner surface of the first-mentioned wall and adjacent to the cabinet bottom; the compressing member normally lying close to the first mentioned wall so as to be clear of the inlet opening; whereby all of the shredded material entering the cabinet through the inlet opening will fall between the compressing member and the second wall; means for swinging the compressing member about its pivot and away from the first wall and toward the second wall for compressing the shredded material and providing a V-shaped space under the inlet opening for receiving additional shredded material when the compressing member is returned to normal position; and a door provided in the second wall against which the shredded material can be compressed and through which the compressed shredded material may be removed.

2. The combination as set forth in claim 1, and in which the cabinet bottom has an outlet opening disposed between the pivot for the compressing member and the inner surface of the first-mentioned wall for permitting the escape of any shredded material falling between the compressing member and the first-mentioned wall.

3. The combination as set forth in claim 1, and in which an electrically operated paper shredding means is arranged for feeding shredded paper into the inlet opening; and an electric switch for connecting the paper shredding means with a source of current; said switch being opened automatically when the paper compressing member is swung to compress the shredded paper in the cabinet; and being closed when the paper compressing member is returned to normal position.

References Cited in the file of this patent

UNITED STATES PATENTS

| Number | Name | Date |
| --- | --- | --- |
| 17,307 | Smith | May 12, 1857 |
| 434,128 | Gainlen | Aug. 12, 1890 |
| 452,287 | Sanders | May 12, 1891 |
| 840,534 | Webb | Jan. 8, 1907 |
| 929,960 | Low | Aug. 3, 1909 |
| 987,913 | Reeves | Mar. 28, 1911 |
| 1,238,784 | Keary | Sept. 4, 1917 |
| 2,086,476 | Quick et al. | July 6, 1937 |
| 2,202,843 | Edwards | June 4, 1940 |
| 2,354,349 | Polsen et al. | July 25, 1944 |
| 2,493,193 | Hait | Jan. 3, 1950 |